Figure 1:
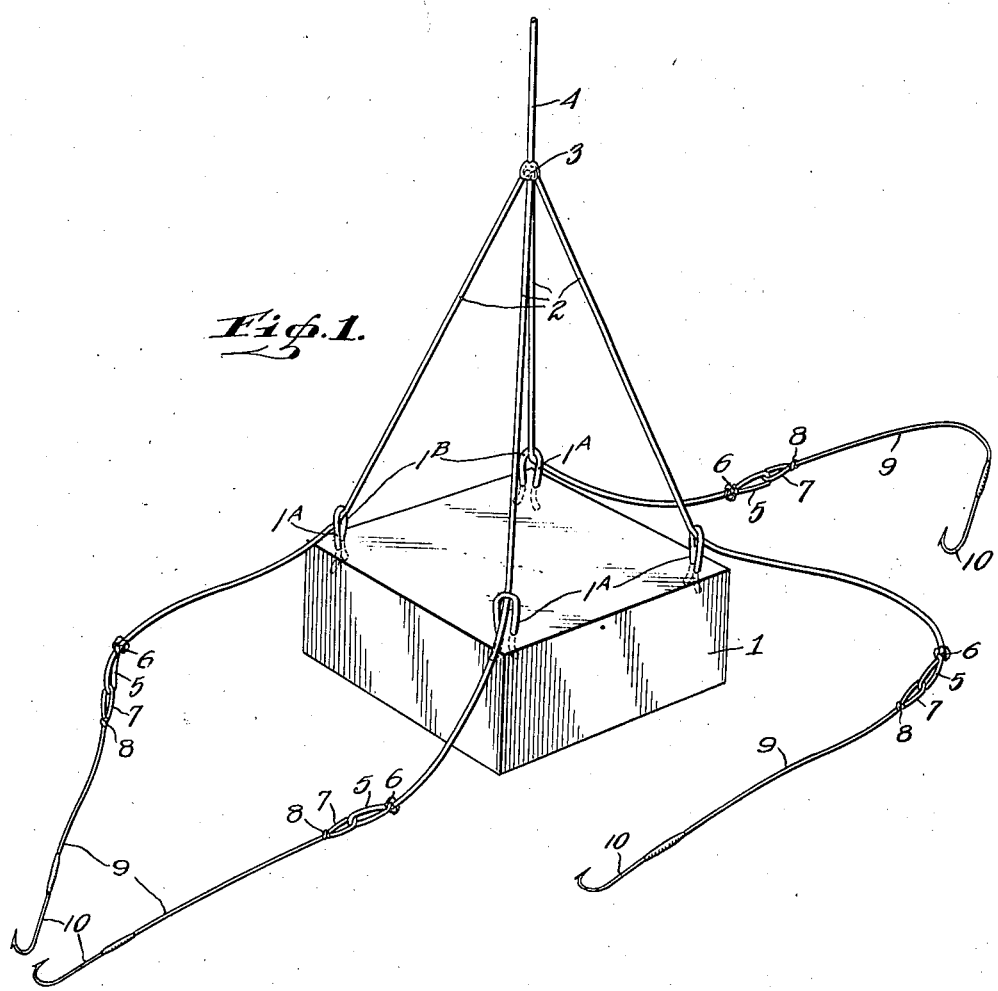

Feb. 1, 1944. G. MERLE 2,340,608
SINKER FOR FISHING LINES
Filed July 3, 1942

INVENTOR
George Merle.

Patented Feb. 1, 1944

2,340,608

UNITED STATES PATENT OFFICE 2,340,608

SINKER FOR FISHING LINES

George Merle, Richmond Hill, N. Y.

Application July 3, 1942, Serial No. 449,645

6 Claims. (Cl. 43—27)

This invention relates to the merchandising of fishing tackle, and particularly to the provision of an improved sinker.

The object of this invention is to provide a square, or any other shaped sinker, having a plurality of eyes securely mounted thereon, a plurality of lines of predetermined length, one set of ends of the lines being secured to a fishing line, the free end of the lines passing loosely through the respective eyes on the sinker, loops on the free ends of the lines, knots on the lines intermediate the loops and the sinker, the knots connecting the loops to the lines and forming stops to prevent the sinker from becoming separated from the fishing line, and a snelled fish hook attached to each loop.

In the operation of this device, it is thrown or dropped into a stream of water and when the sinker rests on the bed of the stream the operator draws the master fishing line taut thereby forcing the stop knots against the eyes on the sinker, and when the master line is released the water current carries the lines away from the sinker. This back and forth motion is very important in the art of fishing, as it keeps the operator on the alert with the expectation of getting a bite or strike, and through the entire operation this improvised sinker remains motionless on the bed of the stream; in prior art the sinker is secured to a fishing line, and the back and forth motion of the sinker to and from the bed of the stream scares the fish away from the baited hooks, and with this and other objects in view, the invention consists in a sinker which is simple in construction and which is hereinafter more fully described and claimed.

The invention is fully disclosed in the following specification, of which the accompanying drawing forms a part, in which the separate parts of my improvement are designated by suitable reference characters, and in which—

The single figure is a perspective view of a square sinker, with a flat bottom and a flat top, and constructed in accordance with my invention.

Referring to the drawing in detail, reference character I designates a square sinker having a flat bottom and a flat top. A plurality of lines 2 of predetermined equal lengths are secured at 3 to a fishing line 4. The lines 2 are adapted to pass loosely through eyes IA secured in the top of the sinker I, as shown.

The free ends of the lines 2 have loops 5 secured by the knots 6, which are on the lines intermediate the loops and the sinker. The knots 6 are larger than the eyes IA, and thereby serve as stops to prevent the separation of the lines 2 from the sinker.

Loops 7 are secured by knots 8 to the snells 9. Each loop 7 passes through a corresponding loop 5, as shown. The snells 9 are secured to the fish hooks 10.

Having fully described my invention, what I claim as new and desire to secure by Letters Patent is:

1. A fishing device comprising a square sinker, having a flat bottom and a flat top, a plurality of eyes securely mounted on the flat top adjacent the corners of the sinker, a plurality of lines of predetermined length, one set of ends of the lines being secured to a fishing line, the free end of the lines passing loosely through the respective eyes on the sinker, lops on the free ends of the lines, and knots on the lines intermediate the loops and the sinker, the knots connecting the loops to the lines and forming stops to prevent the sinker from becoming separated from the fishing line.

2. A fishing device comprising a square sinker, having a flat bottom and a flat top, and a plurality of eyes rigidly secured in the top portion of the sinker adjacent the corners thereof.

3. A fishing device comprising a square sinker, having a flat bottom and a flat top, a plurality of eyes securely mounted in the top portion of the sinker adjacent the corners thereof, and a plurality of lines of predetermined length, one set of ends of the lines being secured to a fishing line, the free end of the lines passing loosely through the respective eyes on the sinker.

4. A fishing device comprising a square sinker, having a flat bottom and a flat top, a plurality of eyes securely mounted in the top portion of the sinker adjacent the corners thereof, a plurality of lines of predetermined length, one set of ends of the lines being secured to a fishing line, the free end of the lines passing loosely through the respective eyes on the sinker, and knots on the free ends of the lines, said knots forming stops to prevent the sinker from becoming separated from the fishing line.

5. A fishing device comprising a square sinker, having a flat bottom and a flat top, a plurality of eyes rigidly secured in the top portion of the sinker adjacent the corners thereof, a plurality of lines of predetermined length, one set of ends of the lines being secured to a fishing line, the free end of the lines passing loosely through the respective eyes on the sinker, loops on the free ends of the lines, and knots on the lines intermediate the loops and the sinker, the knots connecting the loops to the lines and forming stops to prevent the sinker from becoming separated from the fishing line.

6. A fishing device comprising a square sinker, having a flat bottom and a flat top, a plurality of eyes rigidly secured in the top portion of the sinker adjacent the corners thereof, a plurality of lines of predetermined length, one set of ends of the lines secured to provide a knot, the free end of the lines passing loosely through the respective eyes on the sinker, loops on the free ends of the lines, and knots on the lines intermediate the loops and the sinker, the knots connecting the loops to the lines and forming stops to prevent the separation of the lines from the sinker.

GEORGE MERLE.